US012470466B1

(12) United States Patent
Kim et al.

(10) Patent No.: US 12,470,466 B1
(45) Date of Patent: Nov. 11, 2025

(54) CREATING VISUALIZATIONS FOR COMPUTING RESOURCE NETWORKS

(71) Applicant: Amazon Technologies, Inc., Seattle, WA (US)

(72) Inventors: Simon Young-min Kim, Fairfax, VA (US); James Alexander Gray, Cape Town (ZA); Patrick Charles Mahon, Gaithersburg, MD (US); Daniel Charles Rich, Alexandria, VA (US); Pavan Kumar Yakkala, Leander, TX (US); Michael Stephen Bobick, Cape Town (ZA); Bruno Henrique Penteado, Stephenson, VA (US); Johannes Marthinus Bekker, McLean, VA (US); Geoffrey McCarthy, Fort Myers, FL (US); Akshay Choudhry, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 63 days.

(21) Appl. No.: 18/212,960

(22) Filed: Jun. 22, 2023

(51) Int. Cl.
*H04L 41/22* (2022.01)
(52) U.S. Cl.
CPC .................. *H04L 41/22* (2013.01)
(58) Field of Classification Search
None
See application file for complete search history.

(56) References Cited

U.S. PATENT DOCUMENTS

| 7,315,985 | B1 * | 1/2008 | Gauvin | H04L 41/12 |
| | | | | 715/764 |
| 9,172,621 | B1 * | 10/2015 | Dippenaar | H04L 41/0879 |
| 9,531,607 | B1 * | 12/2016 | Pai | H04L 41/5051 |
| 9,565,260 | B2 * | 2/2017 | Roth | G06F 11/3086 |
| 10,469,304 | B1 * | 11/2019 | Kempe | H04L 41/085 |
| 10,574,538 | B1 * | 2/2020 | Shields | H04L 43/20 |
| 10,922,132 | B1 * | 2/2021 | Shiramshetti | G06F 21/53 |
| 11,153,394 | B1 * | 10/2021 | Eberlein | H04L 67/61 |
| 11,252,157 | B1 * | 2/2022 | Khanna | G06F 9/5005 |
| 2002/0135610 | A1 * | 9/2002 | Ootani | H04L 41/22 |
| | | | | 715/734 |
| 2013/0171169 | A1 * | 7/2013 | Lanzavecchia | A61K 39/42 |
| | | | | 435/339 |

(Continued)

*Primary Examiner* — Tuyetlien T Tran
(74) *Attorney, Agent, or Firm* — Perilla Knox & Hildebrandt LLP; Thomas B. Hildebrandt

(57) ABSTRACT

Techniques for a service of a cloud computing system to generate and present users with visualizations of computing resources and their network relationships in private networks of the users. The cloud system obtains resource and network connection data from private networks of users and determines overall network architectures for the computing resources and their network connections. The cloud system generates visualizations that represent the overall network architectures for private networks. The visualizations may comprise single pane-of-glass views for users to quickly understand the architectures and networking inside of their private networks. The visualizations may be interactive in that users can interact with visual depictions of resources and be dynamically presented with networking connections and details for the particular resources.

20 Claims, 14 Drawing Sheets

(56) References Cited

U.S. PATENT DOCUMENTS

| | | | | |
|---|---|---|---|---|
| 2014/0337500 | A1* | 11/2014 | Lee | H04L 41/12 |
| | | | | 709/223 |
| 2015/0370848 | A1* | 12/2015 | Yach | G06F 16/2365 |
| | | | | 707/694 |
| 2016/0337204 | A1* | 11/2016 | Dubey | G06F 3/04847 |
| 2016/0357424 | A1* | 12/2016 | Pang | H04L 45/46 |
| 2016/0359700 | A1* | 12/2016 | Pang | H04L 43/026 |
| 2018/0131585 | A1* | 5/2018 | Bliesner | H04L 67/75 |
| 2018/0295036 | A1* | 10/2018 | Krishnamurthy | H04L 43/026 |
| 2020/0137093 | A1* | 4/2020 | Janakiraman | H04L 63/0263 |
| 2021/0258216 | A1* | 8/2021 | Janakiraman | H04L 45/04 |
| 2022/0191168 | A1* | 6/2022 | Snehashis | H04L 41/22 |
| 2022/0329459 | A1* | 10/2022 | Sundararajan | H04L 12/4666 |
| 2023/0038522 | A1* | 2/2023 | Sim | H04L 47/80 |
| 2023/0275814 | A1* | 8/2023 | Gupta | G06F 3/04847 |
| | | | | 715/735 |
| 2023/0403202 | A1* | 12/2023 | Hall | G06F 3/04817 |
| 2024/0220304 | A1* | 7/2024 | Boyer | H04L 63/1425 |

\* cited by examiner

700 ─┐

```
┌─────────────────────────────────────────────────────────────────┐
│ RUN COMPUTING RESOURCES IN A PRIVATE NETWORK OF A CLOUD SYSTEM,  │
│ WHEREIN THE PRIVATE NETWORK IS USABLE BY A USER ACCOUNT          │
│ REGISTERED WITH THE CLOUD SYSTEM                                 │
│ 702                                                              │
└─────────────────────────────────────────────────────────────────┘
                                │
                                ▼
┌─────────────────────────────────────────────────────────────────┐
│ RECEIVE, VIA A CONSOLE THAT IS USABLE TO MANAGE THE PRIVATE      │
│ NETWORK, A REQUEST FROM THE USER ACCOUNT FOR VISUALIZATION OF    │
│ NETWORKING RELATIONSHIPS BETWEEN THE COMPUTING RESOURCES IN      │
│ THE PRIVATE NETWORK                                              │
│ 704                                                              │
└─────────────────────────────────────────────────────────────────┘
                                │
                                ▼
┌─────────────────────────────────────────────────────────────────┐
│ OBTAIN RESOURCE DATA THAT INDICATES THE COMPUTING RESOURCES      │
│ RUNNING IN THE PRIVATE NETWORK, THE RESOURCE DATA INCLUDING      │
│ ATTRIBUTES FOR THE COMPUTING RESOURCES THAT INDICATE NETWORKS    │
│ RELATIONSHIPS BETWEEN THE COMPUTING RESOURCES                    │
│ 706                                                              │
└─────────────────────────────────────────────────────────────────┘
                                │
                                ▼
┌─────────────────────────────────────────────────────────────────┐
│ DETERMINE THE NETWORK RELATIONSHIPS BETWEEN THE COMPUTING        │
│ RESOURCES IN THE PRIVATE NETWORK USING THE RESOURCE DATA AND     │
│ THE CONNECTION DATA                                              │
│ 708                                                              │
└─────────────────────────────────────────────────────────────────┘
                                │
                                ▼
┌─────────────────────────────────────────────────────────────────┐
│ GENERATE THE VISUALIZATION THAT DEPICTS THE NETWORKING           │
│ RELATIONSHIPS BETWEEN THE COMPUTING RESOURCES IN THE PRIVATE     │
│ NETWORK                                                          │
│ 710                                                              │
└─────────────────────────────────────────────────────────────────┘
                                │
                                ▼
┌─────────────────────────────────────────────────────────────────┐
│ CAUSE PRESENTATION OF THE VISUALIZATION OF THE NETWORKING        │
│ RELATIONSHIPS BETWEEN THE COMPUTING RESOURCES TO THE USER        │
│ ACCOUNT VIA THE CONSOLE                                          │
│ 712                                                              │
└─────────────────────────────────────────────────────────────────┘
```

CREATING VISUALIZATIONS FOR COMPUTING RESOURCE NETWORKS

BACKGROUND

Cloud computing providers offer cloud-based services to fulfill users' computing-service needs without the users having to invest in and maintain computing infrastructure required to implement their services. These cloud providers maintain networks of managed computing resources and functionality to implement various types of scalable, on-demand services, to support workloads of the users. Specifically, the cloud providers maintain networks of data centers, which in turn may include a number of interconnected computing devices (or "servers"), that provide computing resources to support applications or services of the users. Users may be provided with logically isolated, private portions of the cloud provider network, often referred to as virtual networks (VNets) or virtual private clouds (VPCs), in which they can launch resources to support their applications. As the complexity and size of the applications being run by users in the cloud systems increases, it becomes more difficult for users to understand the architectural layout and network relationships between computing resources in their private networks.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 7 illustrates a flow diagram of an example method for a visualization component to obtain data for a private network of a user, generate a visualization representing the architecture of the private network, and cause presentation of the visualization to the user.

DETAILED DESCRIPTION

Figure 1:
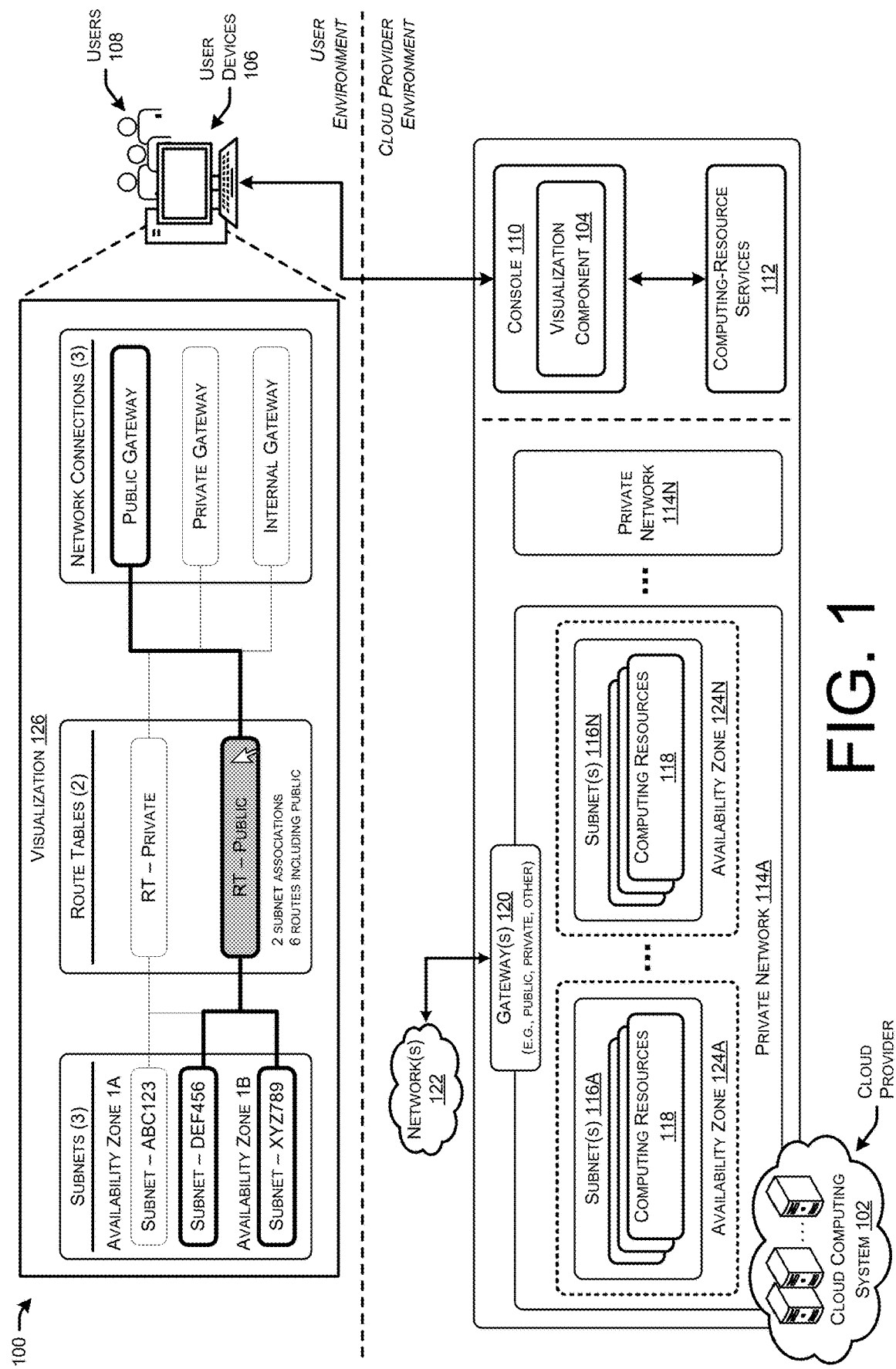
FIG. 1 illustrates a system-architecture diagram of an example environment in which a cloud computing system runs computing resources in private networks for users, and provides users with access to visualizations of the computing resource architectures in the private networks.

This disclosure describes techniques implemented by a cloud computing system for generating and providing users with visualizations of the computing resources and network relationships in private networks of the users. Cloud providers offer consoles or other interfaces through which users are able to manage and view the computing resource used to support applications or services running in the private networks of the users. Using these consoles, users are able to navigate to user interfaces for individual resources in the private networks and view details for those individual resources. However, to understand the overall architectures for all the computing resources in their private networks, users may have to navigate to each individual resource, identify network connections for that resource, and iteratively continue this process to map out the overall resource architectures. According to the techniques described herein, the cloud system may obtain resource data from private networks of users and determine overall network architectures for the computing resources and their network connections. The cloud system may then generate a visualization that represents the overall network architecture for an entire private network of a user. In some instances, the visualizations may include single pane-of-glass views for users to easily and quickly view the architectures and networking inside of their private networks. The visualizations may have resources represented by interactive elements such that users can hover their cursor over resources, select resources, or otherwise interact with resources and be dynamically presented with networking connections and networking details for the particular resources.

As noted above, users of cloud computing systems use consoles to navigate to different user interfaces for individual resources in their private clouds and view details for those individual resources. As an example, to understand a private network (e.g., overlay network, VNet, VPC, etc.) a user may have to navigate to each subnetwork (or "subnet") and view the associated route tables, then navigate to the route tables to identify a target for routes, then look up the subnet where the target resides, and repeat these steps to find the next hop (which could be another target or a network connection). However, this is extremely cumbersome for users, and makes it impractical or impossible to understand the current state of their private network architectures. Without being able to quickly understand the current state of the resource architectures and network relationships for their private networks, it is difficult for users to improve their networks, such as being unable to easily find optimization opportunities, security vulnerabilities, and traffic bottlenecks.

According to the techniques described herein, the cloud computing system may include a visualization component that dynamically determines and generates visualizations (e.g., resource maps, resource mappings, diagrams, user interfaces, etc.) that provide users with views of the computing resources and network relationships in private networks of the users. The visualization component may interact with the users via a console exposed by the cloud computing system. For users that have multiple private networks in the cloud computing system, the users may select a private network in the console for which they would like a visualization generated. The visualization component may perform techniques for dynamically generating a visualization that depicts a current state of the overall architecture of the selected private network.

In response to a user requesting that a visualization be generated and presented representing a private network, the visualization component may collect or obtain data representing a current state of the network architecture. For example, the visualization component may call one or more application programming interfaces (APIs) to obtain resource data that includes a listing of computing resources that are attached or included in the private network, and further includes attributes that indicate network relationships between the computing resources in the private network. The listing of computing resources may include various types of resources deployed in private networks, such as indications of subnets, route tables, public network gateways (e.g., Internet gateways), private network gateways (e.g., Network Address Translation (NAT) gateways), network interfaces, and various endpoints (e.g., storage instances, database instances, compute instances, etc.).

The visualization component may then use the resource data and resource attributes to determine which resources are connected to each other. For instance, the visualization component may determine that a particular subnet has certain route tables attached to it, and those route tables have routes that provide connectivity and/or support traffic flows to various network interfaces or gateways. The visualization component may use the network relationships and connections to iteratively map out all the connections between resources and determine the overall network architecture of the private network.

In some examples, the visualization may be rendered to present the network architecture in a user interface that has a predefined structure or layout. The visualization component may determine where in the visualization layout each computing resource is to be represented and place visual elements in the visualization layout for each computing resource. Further, the visualization component may draw connections between the computing resources that were identified as having network relationships or connections with each other. In this way, the visualization component may create a rendered visualization of the computing architecture of the private network of the user.

The users may be able to access visualizations for their private networks using the console, and may further be able to interact with the visualizations using the console. The users may be able to interact with visual elements of a rendered visualization to be presented with additional resource and/or network connection details for the computing resources in the visualization. As an example, the user may hover their cursor over a visual representation of a subnet and be presented with information for the subnet, such as the Internet Protocol version 4 (IPv4) address ranges (or Classless Inter-Domain Routing (CIDR) blocks) assigned to the subnet, and the IPv6 address ranges or CIDR blocks assigned to the subnet (if any). As another example, the user may hover their cursor over a visual representation of a route table and be presented with information for the route table, such as the number of subnets the route table is associated with and the number of routes in the route table. In some examples, the users may be able to use their cursor to click on or otherwise select a particular computing resource and be navigated to a resource page for that resource. This may be helpful in instances where the user finds a misconfiguration in the particular computing resource, and they would like to navigate to the resource page to re-configure the computing resource.

The techniques described herein are with reference to a cloud computing system or network and services running therein. However, the techniques are equally applicable to any network or environment, and for any computing service. For example, the techniques are equally applicable for other service provider networks, on-premises networks, and so forth. Further, the techniques are equally applicable for different services beyond a visualization component. Additionally, while the techniques are described with respect to creating re visualizations for private networks (e.g., VNets, VPCs, etc.), the techniques are applicable for other networks (e.g., subnets, on-premises networks, etc.). Although described as visualizations, additional terms may be utilized to describe the visualizations such as resource maps, resource mappings, diagrams, drawings, user interface elements, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a cloud computing system 102 runs computing resources in private networks for users 108, and provides users 108 with access to visualizations of the computing resource architectures in the private networks.

The cloud computing system 102 may be operated and/or managed by a cloud provider and may provide various services to users to fulfil their computing resource needs, such as cloud-based computing resources. Users 108 may operate user devices 106 in order to register for use of the computing resources 118 of the cloud computing system 102. The cloud computing system 102 may include the visualization component 104 that provides r visualizations 126 to the users 108 that include visual elements representing the computing resource 118 architectures in private networks 114. Generally, the visualization component 104 may be, at least partly, a control-plane system that controls operations occurring in the cloud computing system 102. The visualization component 104 may be either centralized, or distributed, and be supported by one or more computing devices.

As illustrated, a cloud computing system 102 may be operated and/or managed by a cloud provider. The cloud computing system 102 may provide various services to users 108 to fulfil their computing resource needs, such as cloud-based computing resources. For example, the cloud computing system 102 may provide cloud-based, scalable, and network accessible compute power services, storage services, database services, and/or other services. Users 108 may utilize user devices to subscribe for use of the computing resources and/or services provided by the cloud computing system 102.

Generally, the cloud computing system 102 (sometimes referred to simply as a "cloud" or "cloud network") refers to a pool of network-accessible computing resources (such as compute, storage, and networking resources, applications, and services), which may be virtualized or bare-metal. The cloud can provide convenient, on-demand network access to a shared pool of configurable computing resources 118 that can be programmatically provisioned and released in response to user commands. These resources 118 can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud computing system 102 can be formed as a number of regions, where a region is a separate geographical area in which the cloud provider clusters data centers. Each region can include two or more availability zones 124 connected to one another via a private high-speed network, for example a fiber communication connection. An availability zone 124 (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud computing system 102 (or "cloud provider network"). Preferably, availability zones 124 within a region are positioned far enough away from one other that the same natural disaster should not take more than one availability zone offline at the same time. Users 108 can connect to availability zones 124 of the cloud computing system 102 via a publicly accessible network (e.g., the Internet, a cellular communication network) by way of a transit center (TC). TCs can be considered as the primary backbone locations linking customers to the cloud computing system 102, and may be collocated at other network provider facilities (e.g., Internet service providers, telecommunications providers) and securely connected (e.g., via a VPN or direct connection) to the availability zones 124. Each region can operate two or more TCs for redundancy. Regions are connected to a global network which includes private networking infrastructure (e.g., fiber connections controlled by the cloud provider) connecting each region to at least one other region.

The cloud computing system 102 may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud computing system 102 may provide on-demand, scalable computing services to users 108 through a network, for example allowing users 108 to have at their disposal scalable "virtual computing devices" via their use of the compute servers and block store servers. These virtual computing devices (an example of computing resources 118) have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 108 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 108, the hardware associated with the virtual computing devices can be scaled up or down depending upon the resources the user 108 requires. Users 108 can choose to deploy their virtual computing systems to provide network-based services for their own use and/or for use by their users or client.

The cloud computing system 102 may implement various computing resources 118 or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The computing resources 118 required to support the operations of such services (e.g., compute and storage resources) may be provisioned in an account associated with the cloud computing system 102, in contrast to resources requested by users 108 of the cloud computing system 102, which may be provisioned in user accounts.

The cloud computing system 102 may offer many different built-in services to the users 108 to help run their workloads and services. For instance, the cloud computing system 102 may provide users 108 with use of private networks 114 (e.g., virtual networks (VNets), virtual private clouds (VPCs), etc.), which are logically isolated sections of the cloud computing system 102 that serve as private virtual environments to which only permitted users 108 have access to use. Users 108 may have multiple private networks 114A-114N (where N is any integer of 1 or greater), potentially spanning across different regions of the cloud computing system 102. To help interconnect private networks 114 and other resources of the user's computing infrastructure, the cloud computing system 102 may also offer many different built-in networking services. The private networks 114 may be used by the users 108 to create subnetworks 116A-116N, configure personalized route tables, choose IP addresses, monitor connections, screen network traffic, restrict access into the private networks 114, and/or for other operations. The private networks 114 include or run computing resources 118, such as servers, virtual machines (VMs), containers, serverless functions, workloads, processes, etc. Generally, the computing resources 118 are used to support or run workloads or services of the users 108.

The cloud computing system 102 offers various types of predefined workloads that can be launched on the computing resources 118, where a workload is a collection of resources and code that delivers some functionality, such as a user-facing application or a backend process. In some instances, an application comprises multiple workloads that work together and provide the overall functionality of the application. In other examples, the terms workload and application may be used interchangeably.

As illustrated, the private networks 114 may include or have connections to one or more different types of gateways 120 that provide connectivity to one or more networks 122. The gateways 120 may include a Network Access Translation (NAT) gateway 120 that may be used by instances in a private subnet 116 to connect to services outside the private network 114 such that the external services cannot initiate a connection with those private instances. Generally, a NAT gateway 120 replaces the source IP address of the instances with a private address of the private NAT gateway 120, and when the NAT gateway 120 receives responses from the external devices, translates the address back to the original source IP address. Further, the gateways 120 may include Internet gateways 120 that allows computing resources 118 in private networks 114 to communicate with the Internet (e.g., a network 122) or other public network. The internet gateway 120 enables resources 118 in public subnets 116 (such as endpoints) to connect to the internet if the resource 118 has a public IPv4 address or an IPv6 address. Similarly, resources on the internet can initiate a connection to resources in the subnet 116 using the public IPv4 address or IPv6 address. The internet gateways 120 further provide targets in the route tables for internet-routable traffic. Further, the gateways 120 may include a file gateway that supports a file interface into a storage service of the cloud computing system 102. Using this file gateway 120, resources 118 can access and store objects or files in the storage service. The gateways 120 may include other types of gateways not described herein, and generally comprise any type of connector or interface to other network(s) 122.

The network(s) 122 may include internal networks that are provided by the cloud computing system 102 and/or external networks that are external the cloud computing system 102. The internal networks 122 may include other services provided by the cloud computing system 102 (e.g., storage services, metrics services, etc.). The external networks 122 may include any type of network or service that is not managed by, or located outside of, the cloud computing system 102, such as the Internet, other cloud networks, and/or any other external network or service.

Users 108 of the of cloud computing system may use one or more consoles 110 to navigate to different user interfaces for individual resources 118 in their private networks 114 and view details for those individual resources 118. The console may be exposed to the users 108 via their user devices 106 through a browser or application. The console 110 may communicate or work in conjunction with the visualization component 104 to perform various techniques and present various visualizations 126 as described herein.

The visualization component 104 may dynamically determine and generate visualizations 126 that provide users 108 with depictions of the computing resources 118 and network relationships in private networks 114 of the users 108. The visualization component 104 may interact with the users 108 via the console 110 exposed by the cloud computing system 102. For users 108 that have multiple private networks 114A-1114N in the cloud computing system 102, the users 108 may select a private network 114 in the console 110 for which they would like a visualization 126 generated. The visualization component 104 may perform techniques for dynamically generating a visualization 126 that presents a current state of the overall architecture of the selected private network 114.

In response to a user 108 requesting that a visualization 126 be generated and presented for a private network 114, the visualization component 104 may collect or obtain data representing a current state of the network architecture. For example, the visualization component 104 may call one or more APIs to obtain resource data that includes a listing of computing resources 118 that are attached or included in the private network 114, and connection data that indicates network connections between the computing resources 118 in the private network 114. The listing of computing resources 118 may include various types of resources 118 deployed in private networks 114, such as indications of subnets 116, route tables, public network gateways 120 (e.g., Internet gateways), private network gateways 120 (e.g., Network Address Translation (NAT) gateways), network interfaces, and various endpoints (e.g., storage instances, database instances, compute instances, etc.).

The visualization component 104 may then use the resource and connection data to determine which resources 118 are connected to each other. For instance, the visualization component 104 may determine that a particular subnet 116 has certain route tables attached to it, and those route tables have routes that provide connectivity and/or support traffic flows to various network interfaces or gateways. The visualization component 104 may use the network relationships and connections to iteratively map out all the connections between resources 118 and determine the overall network architecture of the private network 114.

In some examples, the visualization 126 may be rendered to present the network architecture in a user interface according to a predefined structure or layout. The visualization component 104 may determine where in the visualization layout each computing resource 118 is to be represented and place visual elements in the visualization layout for each computing resource 118. Further, the visualization component 104 may draw connections between the computing resources 118 that were identified as having network relationships or connections with each other. In this way, the visualization component 104 may create the visualization 126 that is a rendered presentation of the computing architecture of the private network 114 of the user 108. As shown in the visualization 126, the user device 106 is presented with mappings between three subnets located in two availability zones, the network relationships between those subnets and two route tables (e.g., which route tables are attached to which subnets), and further illustrates connections between the subnets, route tables, and network connections (e.g., public, private, and internal gateways).

The users 108 may be able to access the visualizations 126 for their private networks 114 using the console 110, and may further be able to interact with the visualizations 126 using the console 110. The users 108 may be able to interact with visual elements of a rendered visualization 126 to be presented with additional resource and/or network connection details for the computing resources 118 in the visualization 126. As an example, the user may hover their cursor over a visual representation of a subnet and be presented with information for the subnet, such as the IPv4 address ranges (or CIDR blocks) assigned to the subnet, and the IPv6 address ranges or CIDR blocks assigned to the subnet (if any). As another example, the user 108 may hover their cursor over a visual representation of a route table and be presented with information for the route table, such as the number of subnets the route table is associated with and the number of routes in the route table (e.g., 2 subnet associations and 6 routes, as shown in FIG. 1). Further, the connections between the resource being interacted with may be emphasized with respect to other connections (e.g., bolded, color change, highlighted, etc.). In some examples, the users 108 may be able to use their cursor to click on or otherwise select a particular computing resource 118 and be navigated to a resource page for that computing resource 118. This may be helpful in instances where the user 108 finds a misconfiguration in a computing resource 118, and they would like to navigate to the resource page to re-configure the computing resource 118 or otherwise take an action to modify the computing resource 118.

Although the visualization 126 is depicted as showing subnets, route tables, and network connections, other resources and/or terminology may be used or presented in the visualization 126. That is, other terms or computing resources may be used in addition to, or as alternatives to, the illustrative examples shown and described in this disclosure.

In the example a cloud computing system 102, the users 108 may have created user accounts with the cloud provider to utilize the resources of the cloud computing system 102. The users 108 may utilize their respective user devices 106 to communicate over one or more networks (e.g., WANs, PANs, LANs, etc.) with the cloud computing system 102. The user devices 106 may comprise any type of computing device configured to communicate over network(s), such as mobile phones, tablets, laptop computers, desktop computers, televisions, servers, and/or any other type of computing device. The users 108 (e.g., network administrators, organization employees, etc.) may interact with the cloud computing system 102, via their user account and/or one or more user portals (e.g., web console, command line interface (CLI), application programming interface (API), etc.).

Generally, the visualization component 104, and components thereof, may comprise software, firmware, and/or other logic that is supported one computing device, or across more computing devices in the cloud computing system 102. Additionally, the visualization component 104 may comprise a system of other devices. The techniques described herein are generally described with respect to a cloud provider network, such as a cloud computing system 102 or network. However, the techniques are generally applicable for any network, such as on-premises networks, hybrid networks, and so forth.

The cloud computing system 102 may include one or more hardware processors (processors), one or more devices, configured to execute one or more stored instructions. The processor(s) may comprise one or more cores. Further, the cloud computing system 102 may include one or more network interfaces configured to provide communications between the cloud computing system 102 and other devices, such as the user device(s), and/or other systems or devices in the cloud computing system 102 and/or remote from the cloud computing system 102. The network interfaces may include devices configured to couple to personal area networks (PANs), wired and wireless local area networks (LANs), wired and wireless wide area networks (WANs), and so forth.

The cloud computing system 102 may also include computer-readable media that stores various executable components (e.g., software-based components, firmware-based components, etc.). In addition to various components discussed in FIG. 1, the computer-readable-media may further store components to implement functionality described herein. While not illustrated, the computer-readable media may store one or more operating systems utilized to control the operation of the one or more devices that comprise the cloud computing system 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the cloud computing system 102 may include data stores, or storage, which may comprise one, or multiple, repositories or other storage locations for persistently storing and managing collections of data such as databases, simple files, binary, and/or any other data. The storage may include one or more storage locations that may be managed by one or more database management systems.

To utilize the services provided by the cloud computing system 102, the users 108 may register for an account with the cloud computing system 102. For instance, users 108 may utilize a user device to interact with an identity and access management (IAM) service that allows the users 108 to create user accounts with the cloud computing system 102. Generally, the IAM service may enable the users 108 to manage their network infrastructures remotely, and interact with at least the visualization component 104. Generally, the different user accounts can assume different roles, or sets or permissions/credentials, that allow users 108 to perform different actions, and be restricted from performing some actions.

The computer-readable media may be used to store and retrieve information, such as program modules, data structures, or other data. It should be appreciated by those skilled in the art that computer-readable storage media is any available media that provides for the non-transitory storage of data and that can be accessed by the cloud computing system 102. In some examples, the operations performed by the cloud computing system 102, and or any components included therein, may be supported by one or more server devices. Stated otherwise, some or all of the operations performed by the cloud computing system 102, and or any components included therein, may be performed by one or more computer devices operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 2:
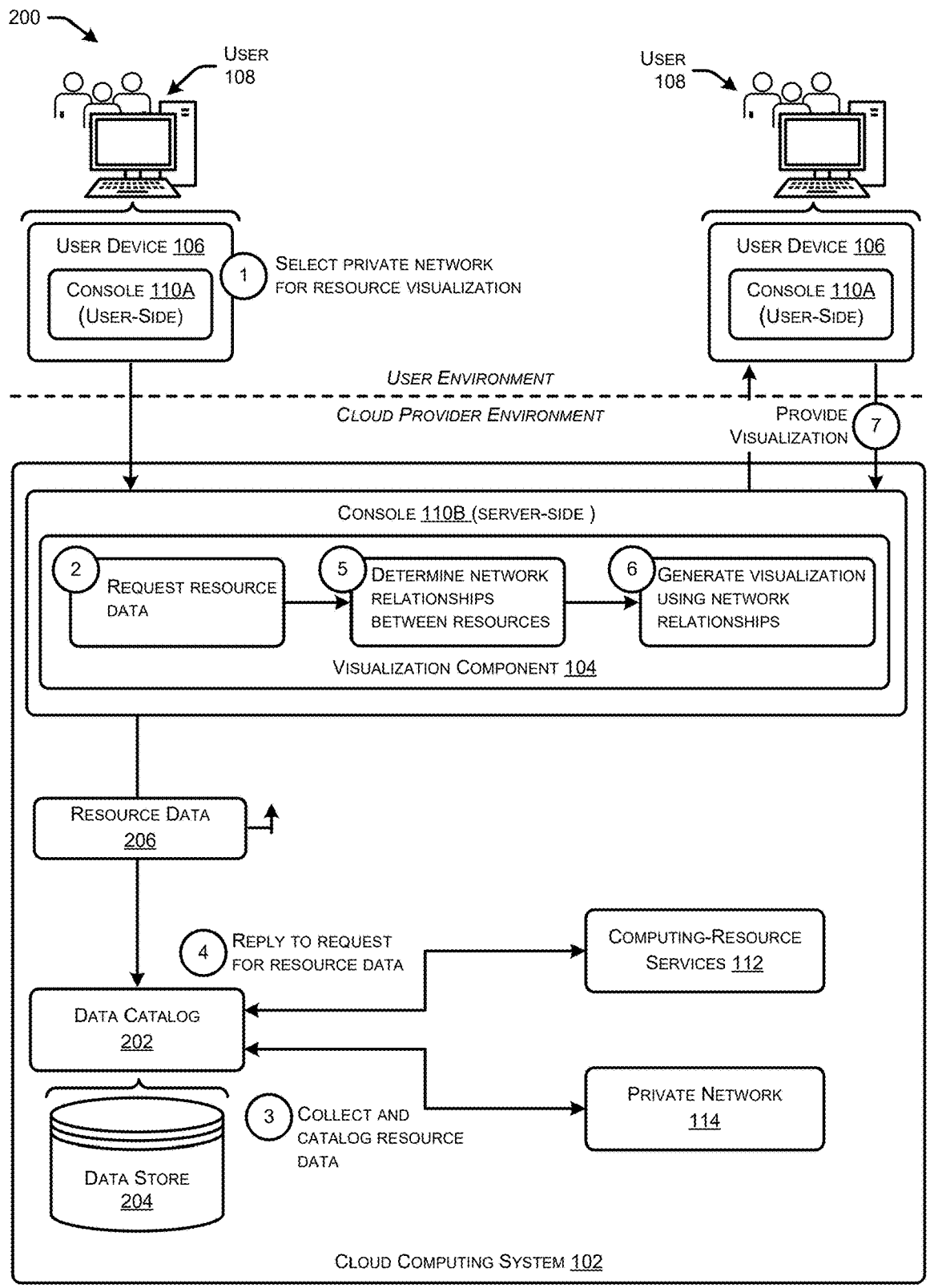
FIG. 2 illustrates a flow diagram of an example process in which a visualization component generates a visualization of computing resources in a private network, and provides the visualization to a user of the private network.

FIG. 2 illustrates a flow diagram of an example process 200 in which a visualization component 104 generates a visualization 126 of computing resources 118 in a private network 114, and provides the visualization 126 to a user 108 of the private network 114.

At 1, a user 108 of the user device 106 may interact with a user-side of the console 110A to select a private network 114 for which the user 108 would like to generate a visualization 126. The console 110A may be code or user interfaces that are rendered on a browser or an application on the user device 106. In some instances, the user 108 may have multiple private networks 114 in the cloud computing system 102 from which to choose from, and the user 108 may select a private network 114 for which it would like a visualization 126 generated from a listing of their private networks 114.

At 2, the visualization component 104 may request data from a data catalog, such as resource data 206. For example, the visualization component 104 may call one or more APIs to obtain resource data 206 that includes a listing of computing resources 118 that are attached or included in the private network 114. In some instances, the computing resources 118 listed in the resource data 206 may be associated with attributes that are attached to the resources. These attributes or metadata may indicate network connections or relationships of the computing resources 118. For example, a subnet that is listed in the resource data 206 may have an identifier (ID) of a private network 114 to which the subnet is in or associated with. As another example, a route table that is listed in the resource data 206 may have an array of routes associated with them that indicate what connections are available through the route table. In some instances, the resource data 206 may be organized in or as a relational database where the attributes are associated with the different computing resources 118 according to relational database principles or structures.

Thus, the resource data 206 may include a listing of various types of resources 118 deployed in the private network 114, such as indications of subnets 116, route tables, public network gateways 120 (e.g., Internet gateways), private network gateways 120 (e.g., NAT gateways), network interfaces, and various endpoints (e.g., storage instances, database instances, compute instances, etc.). Further, the attributes indicated in the resource data 206 may include indications of network relationships and connections between resources 118, such as indications of what computing resources 118 have network connections with each other, and what computing resources 118 have various network relationships with each other. Examples of network relationships include but are not limited to network connections over which traffic is communicated, attachments of route tables to different computing resources 118 (e.g., subnets, endpoints, etc.), security groups, firewalls, etc., to which the computing resources 118 belong, and so forth.

At 3, the data catalog 202 that received the one or more API calls may collect and catalog resource data 206. For instance, the data catalog may scrape or monitor metadata of the private networks 114, and/or may communicate with computing resource-services 112 that provision the computing resources 118 and other components, to determine the resource data 206 for the various private networks 114. The data catalog 202 may store this data in one or more data stores 204, which may be implemented as scalable object storage. At 4, the data catalog 202 may respond to the API call(s) with the requested resource data 206.

At 5, the visualization component 104 may determine network relationships between the computing resources 118. Specifically, the visualization component 104 may then use the resource data 206 to determine which resources 118 are connected to each other. For instance, the visualization component 104 may determine that a particular subnet 116 has certain route tables attached to it, and those route tables have routes that provide connectivity and/or support traffic flows to various network interfaces or gateways 120. The visualization component 104 may use the network relationships and connections to iteratively map out all the connections between resources 118 and determine the overall network architecture of the private network 114.

At 6, the visualization component 104 may generate one or more visualizations 126 using the network relationships determined for the computing resources 118. In some examples, the visualization 126 may be rendered and present the network architecture in a view that has a predefined structure or layout. The visualization component 104 may determine where in the visualization layout each computing resource 118 is to be represented and place visual elements in the visualization layout for each computing resource 118. Further, the visualization component 104 may draw connections between the computing resources 118 that were identified as having network relationships or connections with each other. In this way, the visualization component 104 may create the visualization 126 that is a rendered depiction of the computing architecture of the private network 114 of the user 108.

At 7, the console 110B (server-side code) may provide the visualization 126 to the console 11A (user-side code) to render the visualization 126 on a display of the user device 106. The user 108 may be able to access the visualization 126 for their private network 114 using the console 110, and may further be able to interact with the visualization 126 using the console 110. The user 108 may be able to interact with visual elements of a rendered visualization 126 to be presented with additional resource and/or network connection details for the computing resources 118 in the visualization 126. As an example, the user may hover their cursor over a visual representation of a subnet and be presented with information for the subnet, such as the IPv4 address ranges (or CIDR blocks) assigned to the subnet, and the IPv6 address ranges or CIDR blocks assigned to the subnet (if any). As another example, the user 108 may hover their cursor over a visual representation of a route table and be presented with information for the route table, such as the number of subnets the route table is associated with and the number of routes in the route table (e.g., 2 subnet associations and 6 routes, as shown in FIG. 1). Further, the connections between the resource being interacted with may be emphasized with respect to other connections (e.g., bolded, color change, highlighted, etc.). In some examples, the users 108 may be able to use their cursor to click on or otherwise select a particular computing resource 118 and be navigated to a resource page for that computing resource 118. This may be helpful in instances where the user 108 finds a misconfiguration in a computing resource 118, and they would like to navigate to the resource page to reconfigure the computing resource 118.

FIGS. 3, 4A-4C, 5, and 6 all illustrate various user interfaces that represent aspects of the techniques described herein. However, these user interfaces are merely examples of user interfaces that may be used, and in some examples, other user interface layouts, elements, resource types, and so forth, may be used according to the techniques described herein.

Figure 3:
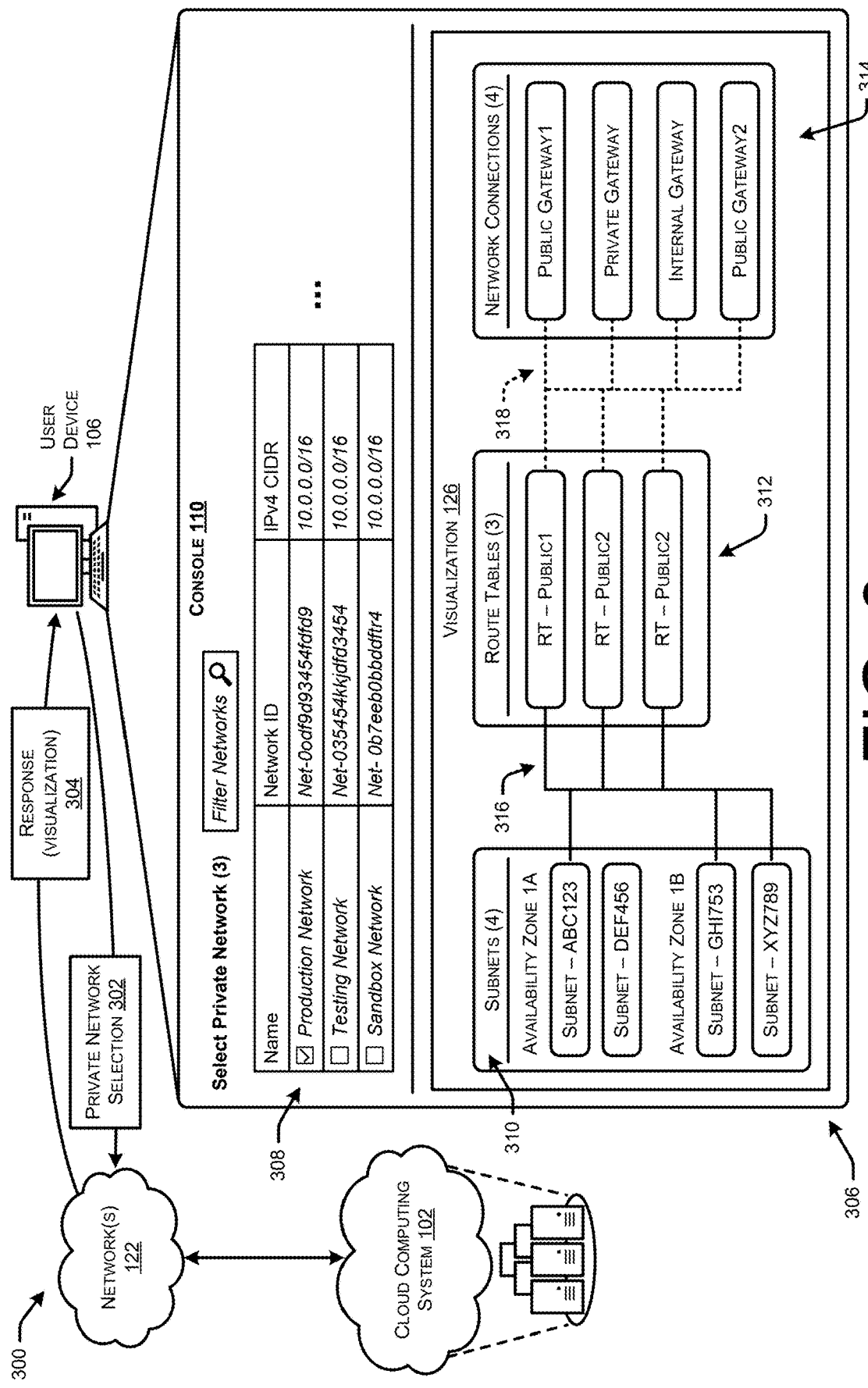
FIG. 3 illustrates a user interface that receives a selection of a private network from a user, and dynamically presents a visualization of computing resources in the private network.

FIG. 3 illustrates an environment 300 in which a user interface 306 receives a user selection 302 of a private network from a user, and dynamically presents a visualization 126 of the private network 114. The cloud computing system 102 may communicate over one or more networks 122 (e.g., the Internet, on-premises network, local area network, etc.) with the user device 106 and send a response 304 to the user device 106 that includes the requested visualization 126.

The user interface (UI) 206 may include a selection field 308 in which the user 108 is able to view, search, and filter the various private networks 114 they have running in the cloud computing system 102. The user 108 may interact with the selection field 308 and select a private network 114 for which they would like a visualization 126 generated and rendered. In response to selecting the private network 114 for which they would like a visualization 126, the user device 106 may send the private network selection 302 and receive a response 304 that includes at least the visualization 126 of the computing resources 118 and relationships in the private network 114.

The UI 306 may render or present (either with the selection field 308 or without) the visualization 126 for the user 108. As shown, the visualization 126 may be rendered and present the network architecture in a view that has a predefined structure or layout. The visualization component 104 may determine where in the visualization layout each computing resource 118 is to be represented and place visual elements in the visualization layout for each computing resource 118. As shown in the illustrative example, the visualization 126 may include indications of subnets 310 on the left, route tables 312 in the middle, and network connections 314 (e.g., gateways 120) on the right. However, other layouts may be used as well in some instances.

Further, the visualization component 104 may draw connections between the computing resources 118 that were identified as having network relationships or connections with each other. In some instances, solid lines may represent network relationships 316 between resources, such as a route table 312 being attached to a subnet 310. Further, the dotted lines may represent network traffic sent over the network connections 318 to resources, such as network traffic that is sent from a subnet 310 and to a network connection 314, such as a gateway 120.

In this way, the visualization component 104 may create the visualization 126 that is a rendered view of the computing architecture of the private network 114 of the user 108. As shown in the visualization 126, the user device 106 is presented mappings between four subnets 310 located in two availability zones, the network relationships 316 between those subnets 310 and three route tables 312 (e.g., which route tables 312 are attached to which subnets 310), and further illustrates network connections 318 between the subnets 310, route tables 312, and network connections 314 (e.g., public, private, and internal gateways).

Figure 4A:
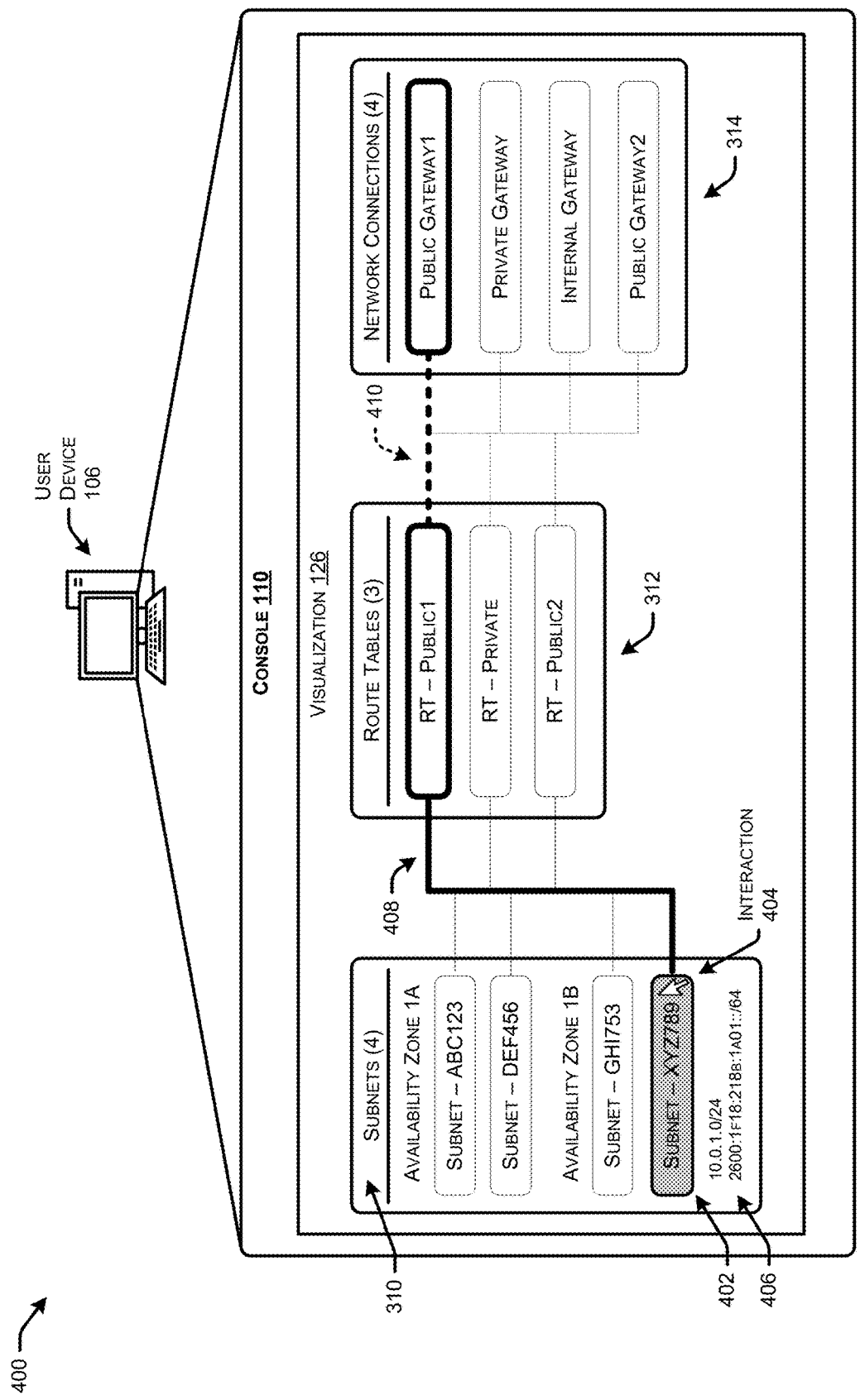
FIG. 4A illustrates a user interface that presents a visualization of resources in a private network of a user, and dynamically presents network relationships and network details for a subnetwork resource in the visualization with which the user has interacted.

FIG. 4A illustrates a user interface 400 that presents a visualization 126 for a private network 114 of a user 108, and dynamically presents network relationships and network details for a subnet 310 in the visualization 126 with which the user 108 has interacted.

As shown, the user 108 may use their cursor (or other input device, such as touch selection, keyboard, voice, etc.) and interact with a subnet visual element 402. In response to the interaction 404, the subnet visual element 402 may dynamically change to illustrate the interaction 404, such as by changing color, highlighting, and/or any other visual changes. Further, the network relationships 408 and network connections 410 for the subnet visual element 402 may change as well to illustrate to the user 108 the network relationships 316 and network connections 318 associated with the subnet visual element 402. As shown, the network relationships 408 and network connections 410 for the subnet visual element 402 have changed their presentation as compared to the other network relationships 316 and network connections 318. In this example, the network relationships 408 and network connections 410 for the subnet visual element 402 have become darker, but in other examples, other visualization changes may occur.

In addition to showing changes to the network relationships 408 and network connections 410 for the subnet visual element 402, the UI 400 may present network details 406 associated with the subnet visual element 402. As shown, the network details 406 in this example include the IPv4 address ranges (or CIDR) block(s) assigned to the subnet 310 (e.g., 10.0.1.0/24), and the IPv6 address ranges or CIDR blocks assigned to the subnet (e.g., 2600:1F18:218B:1A01::/64). However, additional and/or alternative network details 406 may be displayed or presented in response to detecting the interaction 404.

Figure 4B:
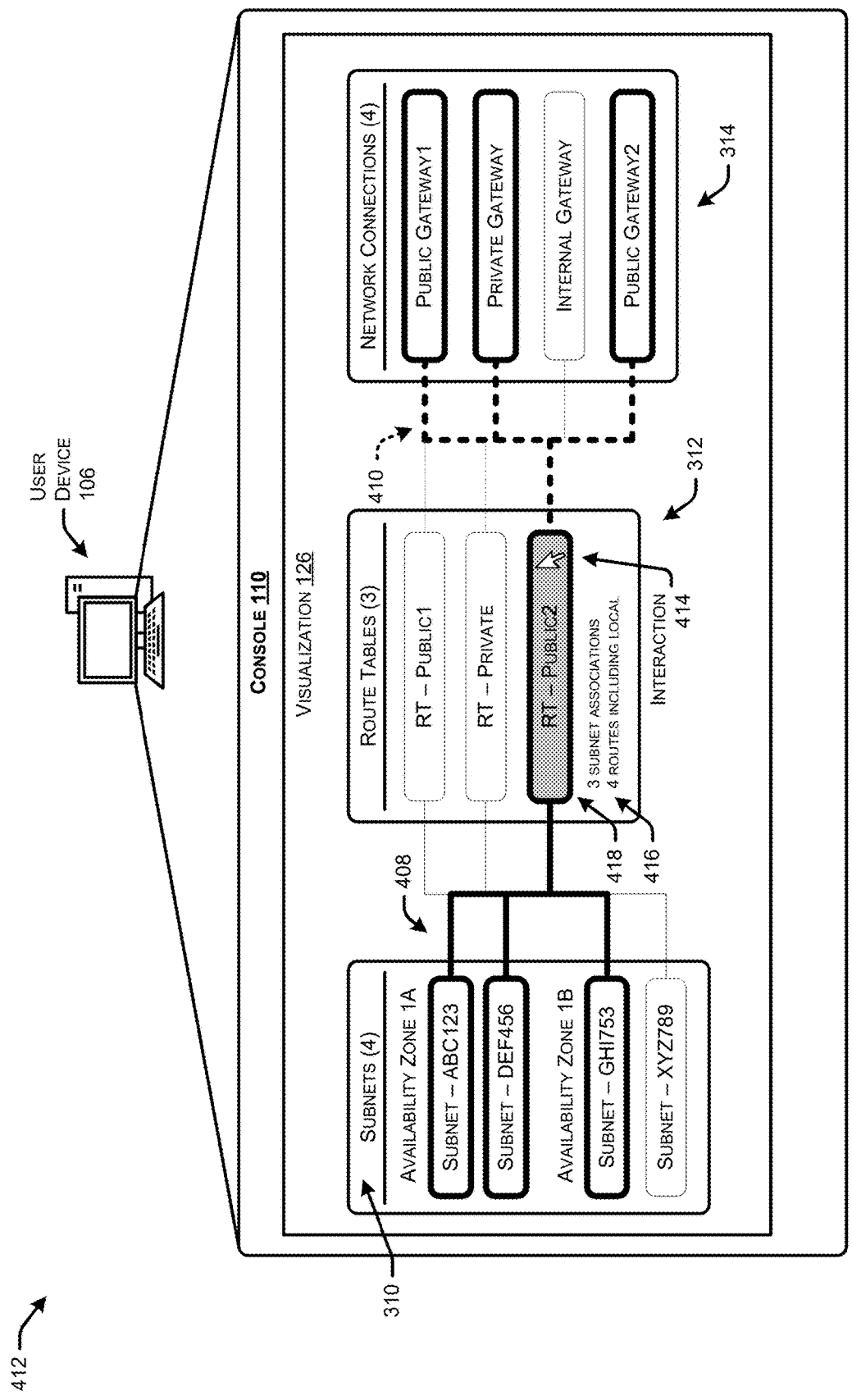
FIG. 4B illustrates a user interface that presents a visualization of resources in a private network of a user, and dynamically presents network relationships and network details for a route table in the visualization with which the user has interacted.

FIG. 4B illustrates a user interface 412 that presents a visualization 126 for a private network 114 of a user 108, and dynamically presents network relationships and network details for a route table 312 in the visualization 126 with which the user 108 has interacted.

As shown, the user 108 may use their cursor (or other input device, such as touch selection, keyboard, voice, etc.) and interact with a route table visual element 418. In response to the interaction 414, the route table visual element 418 may dynamically change to illustrate the interaction 414, such as by changing color, highlighting, and/or any other visual changes. Further, the network relationships 408 and network connections 410 for the route table visual element 418 may change as well to illustrate to the user 108 the network relationships 316 and network connections 318 associated with the route table visual element 418. As shown, the network relationships 408 and network connections 410 for the route table visual element 418 have changed their presentation as compared to the other network relationships 316 and network connections 318. In this example, the network relationships 408 and network connections 410 for the subnet visual element 402 have become darker, but in other examples, other visualization changes may occur.

In addition to showing changes to the network relationships 408 and network connections 410 for the route table visual element 418, the UI 412 may present network details 416 associated with the route table visual element 418. As shown, the network details 416 in this example include the number of subnets with which the route table 312 is attached or associated, and the number of routes in the route table, including local routes. However, additional and/or alternative network details 406 may be displayed or presented in response to detecting the interaction 404.

Figure 4C:
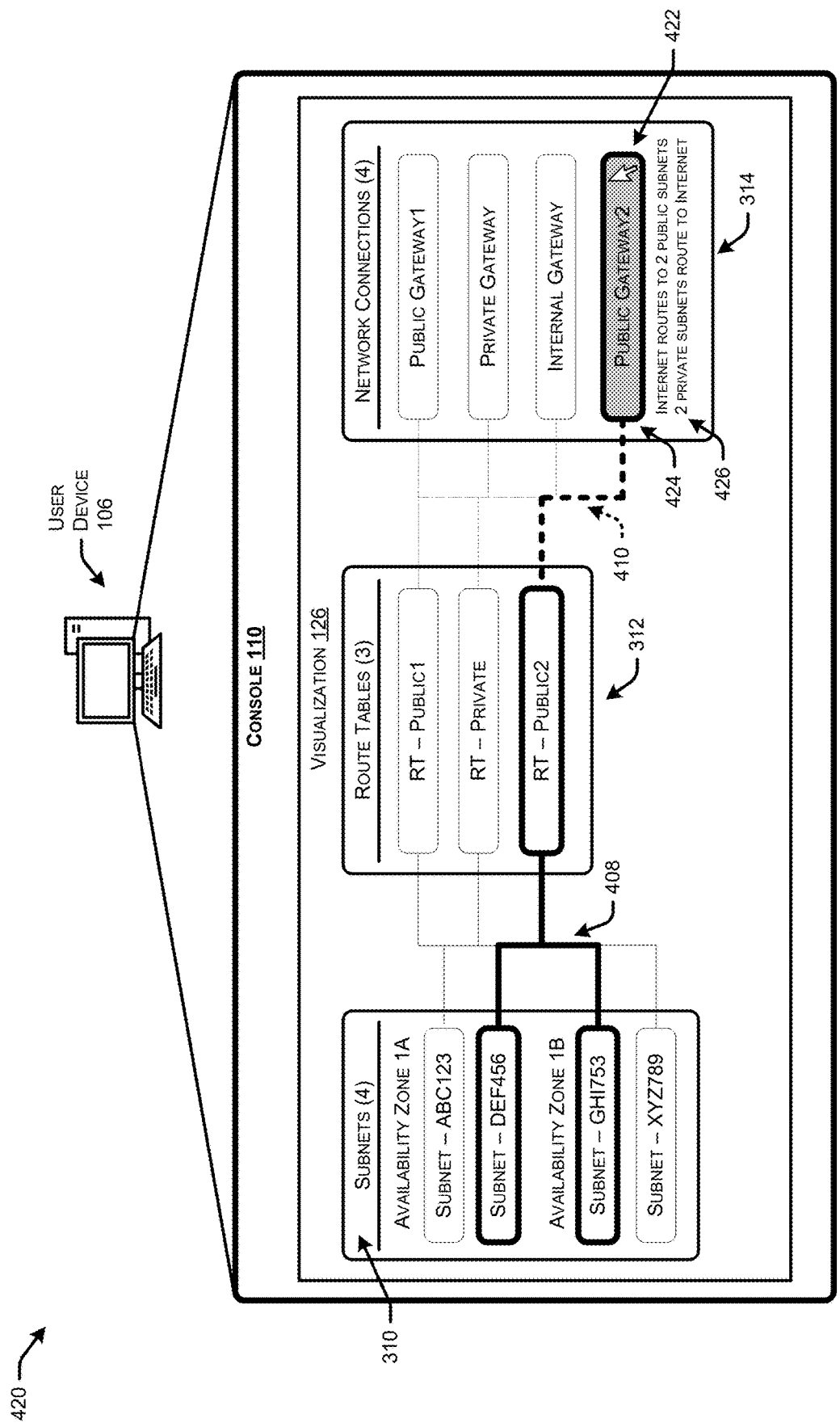
FIG. 4C illustrates a user interface that presents a visualization of resources in a private network of a user, and dynamically presents network relationships and network details for a network connection in the visualization with which the user has interacted.

FIG. 4C illustrates a user interface 420 that presents a visualization 126 for a private network 114 of a user 108, and dynamically presents network relationships and network details for a network connection 314 in the visualization 126 with which the user 108 has interacted.

As shown, the user 108 may use their cursor (or other input device, such as touch selection, keyboard, voice, etc.) and interact with a network connection visual element 424.

In response to the interaction 422, the network connection visual element 424 may dynamically change to illustrate the interaction 422, such as by changing color, highlighting, and/or any other visual changes. Further, the network relationships 408 and network connections 410 for the route table visual element 418 may change as well to illustrate to the user 108 the network relationships 316 and network connections 318 associated with the network connection visual element 424. As shown, the network relationships 408 and network connections 410 for the route table visual element 418 have changed their presentation as compared to the other network relationships 316 and network connections 318. In this example, the network relationships 408 and network connections 410 for the network connection visual element 424 have become darker, but in other examples, other visualization changes may occur.

In addition to showing changes to the network relationships 408 and network connections 410 for the network connection visual element 424, the UI 420 may present network details 426 associated with the network connection visual element 424. As shown, the network details 426 in this example include the number of Internet routes provided to two public subnets 310, and the number of private subnets 310 with routes to the Internet. However, additional and/or alternative network details 426 may be displayed or presented in response to detecting the interaction 422.

Figure 5:
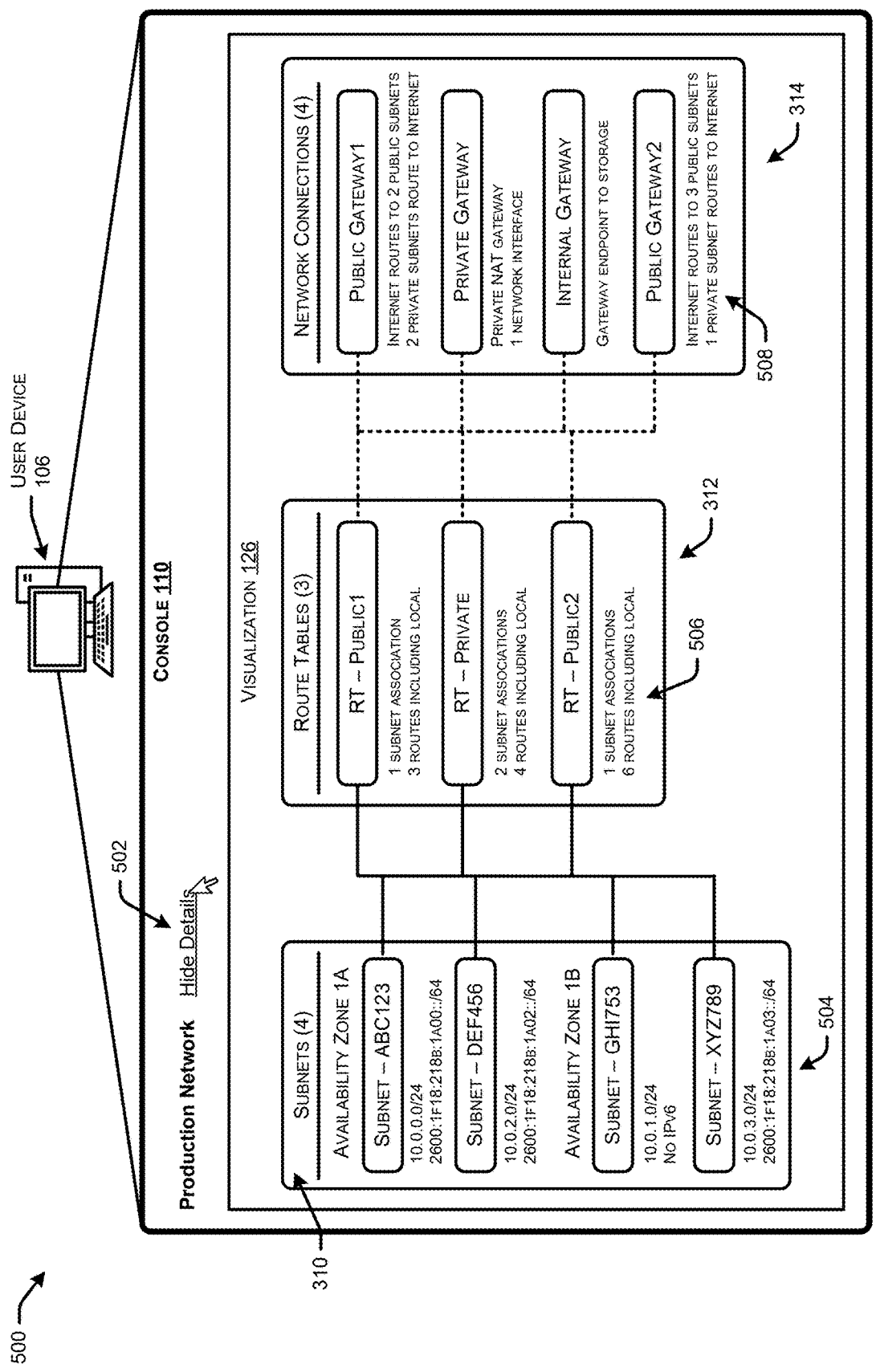
FIG. 5 illustrates a user interface that presents a visualization of computing resources in a private network of a user that includes network details for all the computing resources in the private network of the user.

FIG. 5 illustrates a user interface 500 that presents a visualization 126 for a private network 114 of on a user device 106 that includes network details for some or all of the computing resources 118 in the private network 114 of the user 108.

As shown, the user 108 of the user device 106 may select and toggle between a details option 502 to "hide details" or "show details" for all the computing resources 118 represented in the visualization 126. In the illustrated example, the user 108 has selected the "show details" option of the details option 502. This selection results in network details being shown for some or all of the computing resources 118 represented in the visualization 126. As shown, the network details 504 for the subnets 310 are illustrated, the network details 506 for the route tables 312 are illustrated, and the network details 508 for the network connections 314 are all illustrated. Although certain types of details are shown for the computing resources 118, in some examples, additional and/or alternative details may be shown for the computing resources 118, and different computing resources 118 and details may be shown.

Figure 6:
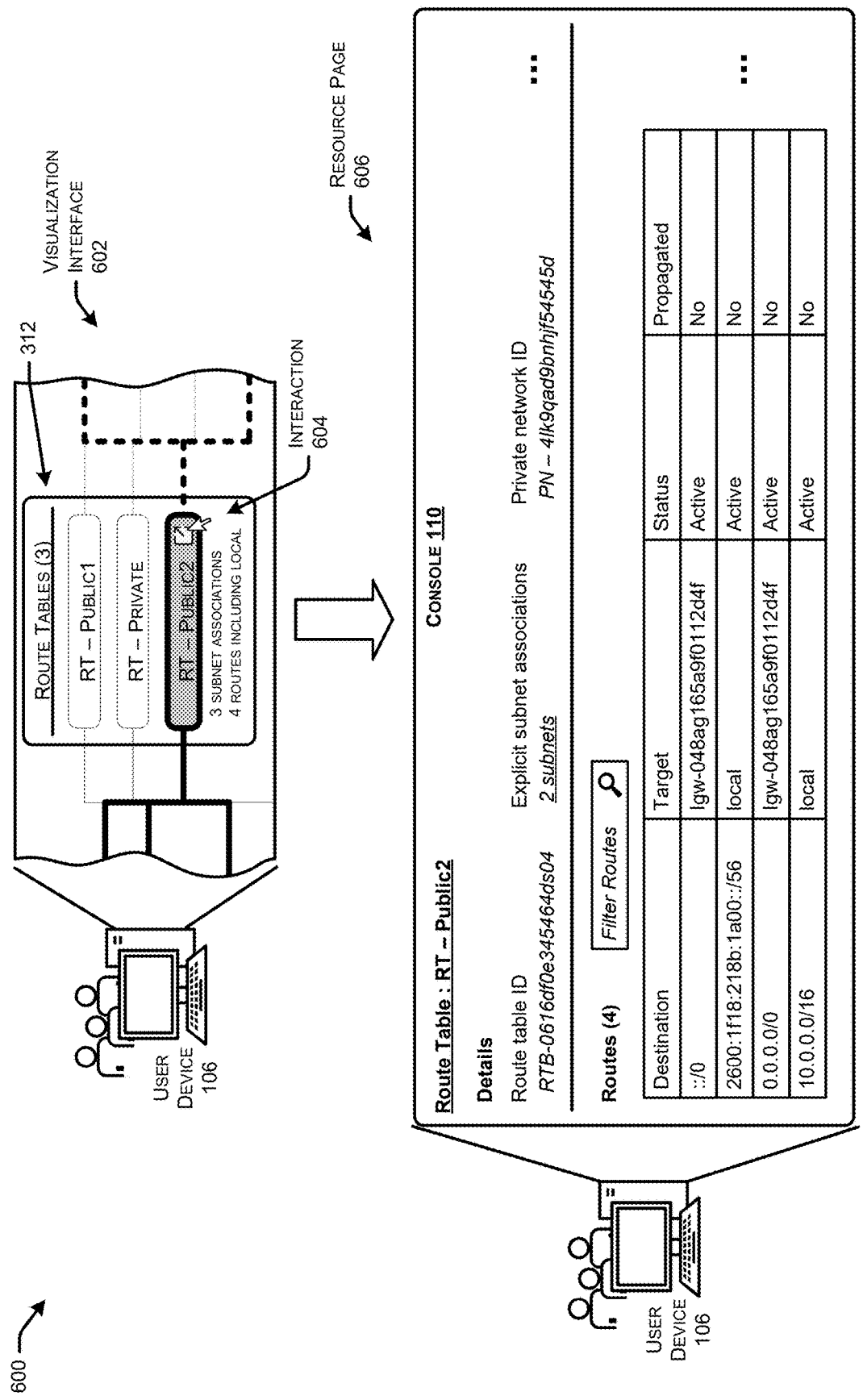
FIG. 6 illustrates an example where a user interacts with a visual element in a visualization of a private network and is taken to a resource page for the corresponding resource to view additional details about the resource and potentially re-configure the resource.

FIG. 6 illustrates an example where a user 108 interacts with a visual element in a visualization 126 and is taken to a resource page for the corresponding resource to view additional details about the resource and potentially re-configure the resource.

The user device 106 may initially present a visualization interface 602, such as at least a portion of the visualization 126. The user 108 may perform an interaction 604 with a particular route table 312 shown in the visualization interface 602. The interaction 604 may comprise any type of interaction 604, such as a click of an icon (e.g., open icon) that results in the visualization component 104 dynamically rendering or presenting a resource page 606 of the route table 312 that experienced the interaction 604.

The resource page 606 may include details for the route table 312 that the user 108 may wish to see. Additionally, the user 108 may be able to re-configure the route table 312 in the resource page 606 in instances where the user 108 noticed a misconfiguration in the visualization 126.

Figure 8:
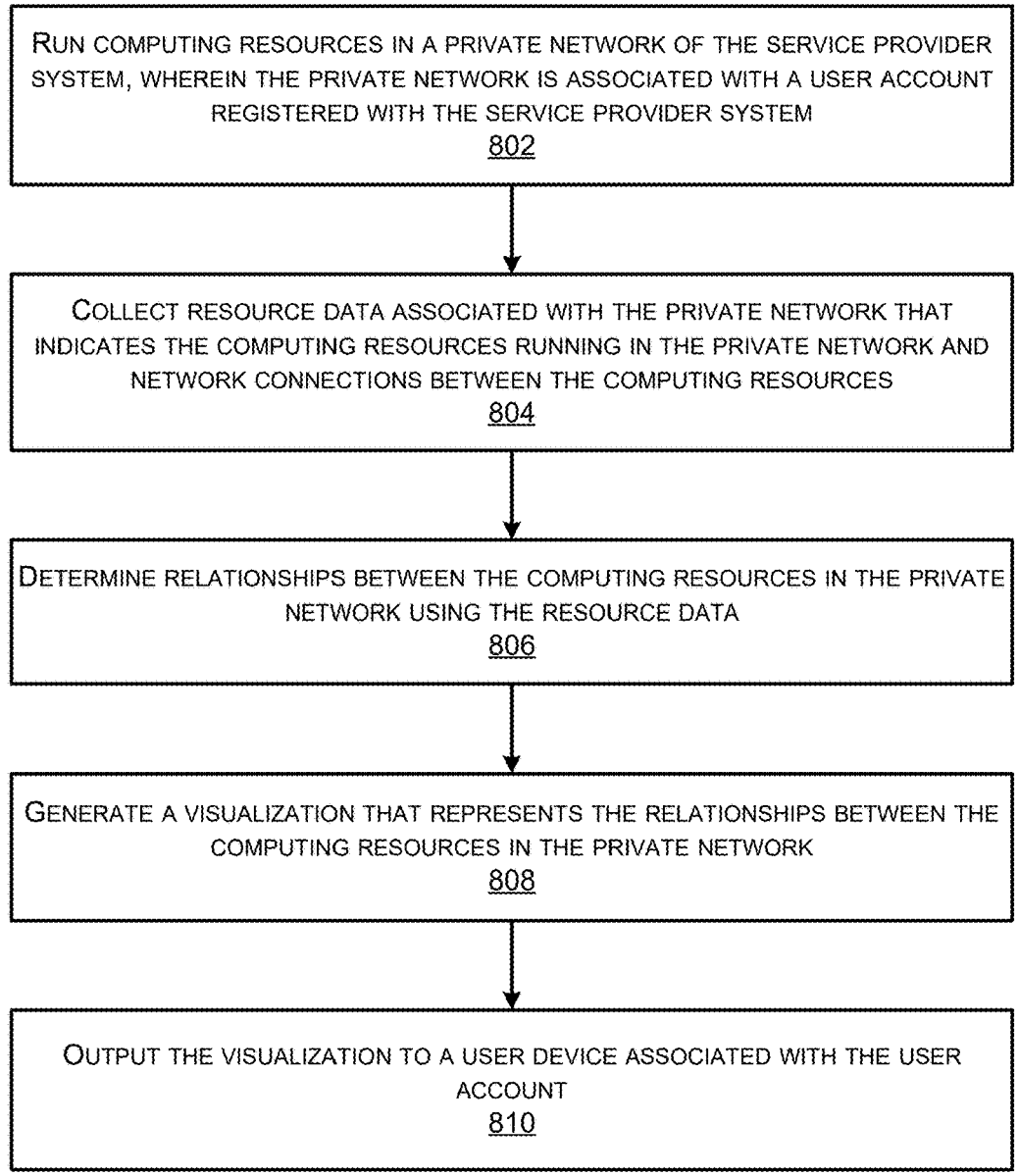
FIG. 8 illustrates a flow diagram of another example method for a visualization component to obtain data for a private network of a user, generate a visualization representing the architecture of the private network, and cause presentation of the visualization to the user.
Figure 9:
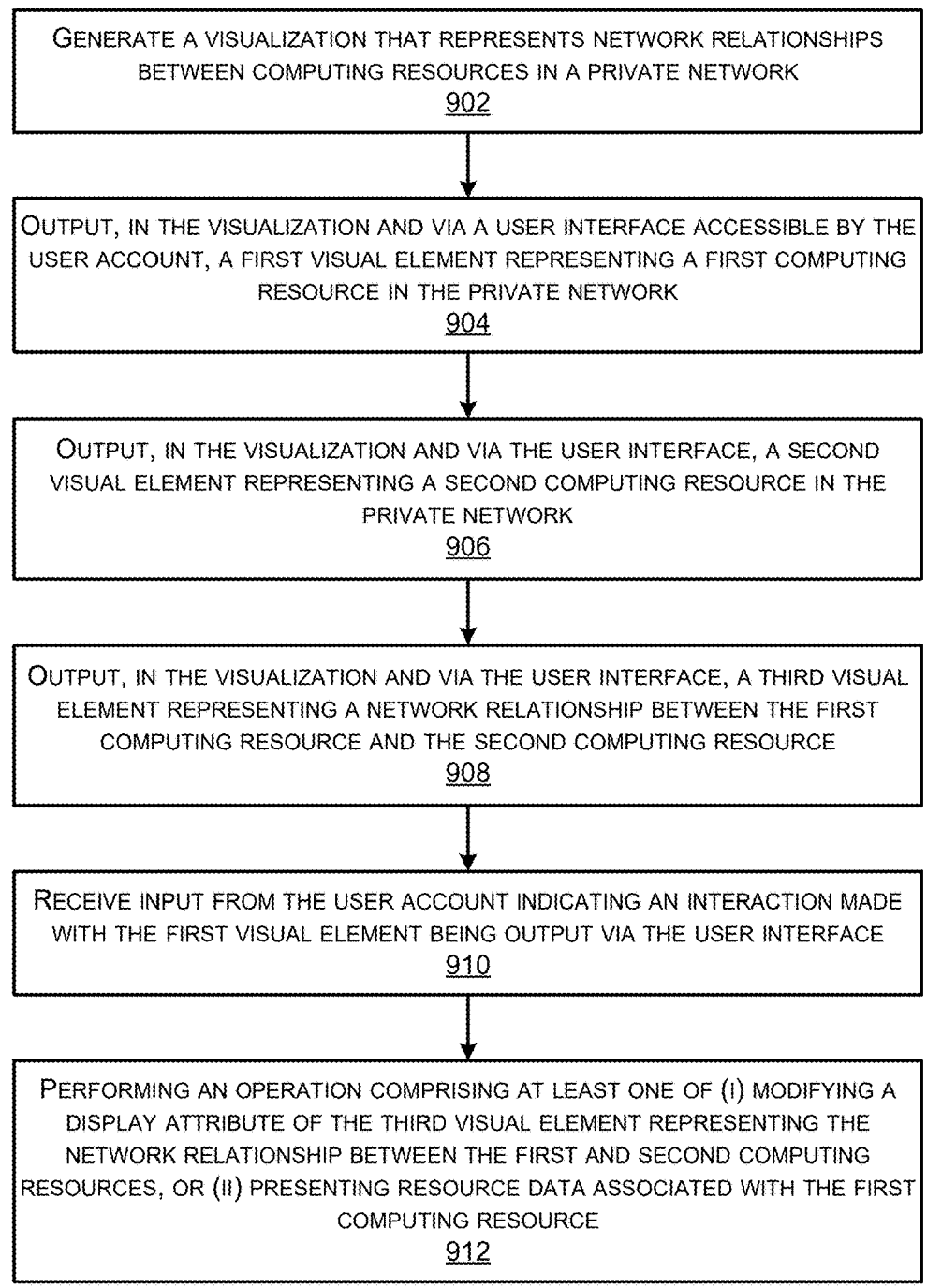
FIG. 9 illustrates a flow diagram of an example method for a visualization component to output visual elements of a visualization of a private network through a user interface, receive input from a user account associated with the user interface, and perform an operation based on receiving the user input.

FIGS. 7, 8, and 9 illustrate flow diagrams of example methods 700, 800, and 900 that illustrate aspects of the functions performed at least partly by the cloud computing system 102 as described in this disclosure. The logical operations described herein with respect to FIGS. 7, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 7 illustrates a flow diagram of an example method 700 for a visualization component 104 to obtain data for a private network 114 of a user 108, generate a visualization 126 representing the architecture of the private network 114, and cause presentation of the visualization 126 to the user 108.

At 702, a cloud computing system 102 may run computing resources 118 in a private network 114. In some instances, the private network 114 may be usable by a user account that is registered with the cloud computing system 102. The computing resources 118 deployed in the private network 114 may include subnets 116, route tables, public network gateways 120 (e.g., Internet gateways), private network gateways 120 (e.g., NAT gateways), network interfaces, and/or various endpoints (e.g., storage instances, database instances, compute instances, etc.).

At 704, the cloud computing system 102 may receive, via an interface (e.g., console 110) that is usable to manage the private network 114, a request from the user account for a visualization 126 representing network relationships between the computing resources 118 in the private network 114. In some instances, the user 108 may provide a private network selection 302.

At 706, the cloud computing system 102 may obtain resource data 206 that indicates the computing resources 118 running in the private network 114. In some instances, the resource data 206 includes a listing of the computing resources 118 attached or in the private network, as well as attributes for the computing resources 118 that indicate relationships between the computing resources 118.

At 708, the cloud computing system 102 may, using the resource data, determine the network relationships between the computing resources in the private network. For instance, the visualization component 104 may determine that a particular subnet 116 has certain route tables attached to it, and those route tables have routes that provide connectivity and/or support traffic flows to various network interfaces or gateways 120. The visualization component 104 may use the network relationships and connections to iteratively map out all the connections between resources 118 and determine the overall network architecture of the private network 114.

At 710, the cloud computing system 102 may generate the visualization that represents the network relationships between the computing resources in the private network. In some examples, the visualization 126 may be rendered and present the network architecture in a view that has a predefined structure or layout. The visualization component 104 may determine where in the visualization layout each computing resource 118 is to be represented and place visual elements in the visualization layout for each computing resource 118. Further, the visualization component 104 may draw connections between the computing resources 118 that were identified as having network relationships or connections with each other. In this way, the visualization component 104 may create the visualization 126 that is a rendered view of the computing architecture of the private network 114 of the user 108.

At 712, the cloud computing system 102 may cause presentation of the visualization 126 that represents the network relationships between the computing resources to the user account via the interface. For instance, the visualization 126 may be presented via a console 110 and on a user interface 306 of the user device 106.

FIG. 8 illustrates a flow diagram of another example method 800 for a visualization component 104 to obtain data for a private network 114 of a user 108, generate a visualization 126 representing the architecture of the private network 114, and cause presentation of the visualization 126 to the user 108.

At 802, a cloud computing system 102 may computing resources 118 in a private network 114. In some instances, the private network 114 may be usable by a user account that is registered with the cloud computing system 102. The computing resources 118 deployed in the private network 114 may include subnets 116, route tables, public network gateways 120 (e.g., Internet gateways), private network gateways 120 (e.g., NAT gateways), network interfaces, and/or various endpoints (e.g., storage instances, database instances, compute instances, etc.).

At 804, the cloud computing system 102 may collect resource data 206 associated with the private network 114 that indicates the computing resources 118 running in the private network 114 and attributes associated with the computing resources. For instance, the visualization component 104 may call one or more APIs that return a listing of computing resources 118 in the resource data 206 and associated attributes that are attached to the resources. These attributes or metadata may indicate network connections or relationships of the computing resources 118. For example, a subnet that is listed in the resource data 206 may have an identifier (ID) of a private network 114 to which the subnet is in or associated with. As another example, a route table that is listed in the resource data 206 may have an array of routes associated with them that indicate what connections are available through the route table. In some instances, the resource data 206 may be organized in or as a relational database where the attributes are associated with the different computing resources 118 according to relational database principles or structures.

At 806, the cloud computing system 102 may, using the resource data 206, determine relationships between the computing resources 118 in the private network 114. For instance, the visualization component 104 may determine that a particular subnet 116 has certain route tables attached to it, and those route tables have routes that provide connectivity and/or support traffic flows to various network interfaces or gateways 120. The visualization component 104 may use the network relationships and connections to iteratively map out all the connections between resources 118 and determine the overall network architecture of the private network 114.

At 808, the cloud computing system 102 may generate a visualization that represents the relationships between the computing resources in the private network. In some examples, the visualization 126 may be rendered and present the network architecture in a view that has a predefined structure or layout. The visualization component 104 may determine where in the visualization layout each computing resource 118 is to be represented and place visual elements in the visualization layout for each computing resource 118. Further, the visualization component 104 may draw connections between the computing resources 118 that were identified as having network relationships or connections with each other. In this way, the visualization component 104 may create the visualization 126 that is a rendered view of the computing architecture of the private network 114 of the user 108.

At 810, the cloud computing system 102 may output the visualization 126 to a user device 106 associated with the user account. For instance, the visualization 126 may be presented via a console 110 and on a user interface 306 of the user device 106.

FIG. 9 illustrates a flow diagram of an example method 900 for a visualization component 104 to output visual elements of a visualization 126 through a user interface, receive input from a user account associated with the user interface, and perform an operation based on receiving the user input.

At 902, a visualization component 104 may generate a visualization 126 that represents relationships between computing resources 118 in a private network 114. The private network 114 may be associated with a user account of a cloud computing system 102 in which the private network 114 is running.

At 904, the visualization component 104 may output, in the visualization 126 and via a user interface accessible by the user account, a first visual element representing a first computing resource 118 in the private network 114. The first visual element may represent one or more of a subnet 116, route table, public network gateway 120 (e.g., Internet gateways), private network gateway 120 (e.g., NAT gateways), network interface, and/or various endpoints (e.g., storage instances, database instances, compute instances, etc.).

At 906, the visualization component 104 may output, in the visualization 126 and via the user interface, a second visual element representing a second computing resource 118 in the private network 114.

At 908, the visualization component 104 may output, in the visualization 126 and via the user interface, a third visual element representing a relationship between the first computing resource 118 and the second computing resource 118. Examples of such a relationship includes but is not limited to network connections over which traffic may be communicated, network traffic flows over network connections, attachments of route tables to different computing resources 118 (e.g., subnets, endpoints, etc.), security groups, firewalls, policy groups, etc., to which the computing resources 118 belong, and so forth.

At 910, the visualization component 104 may receive input from the user account indicating an interaction made with the first visual element being output via the user interface. For instance, a user 108 may hover their cursor over the first visual element, click the first visual element, or otherwise interact with the first visual element.

At 912, the visualization component 104 may, based at least in part on the interaction, perform an operation comprising at least one of (i) modifying a display attribute of the third visual element representing the relationship between the first and second computing resources 118, or (ii) presenting resource data associated with the first computing resource 118.

Figure 10:
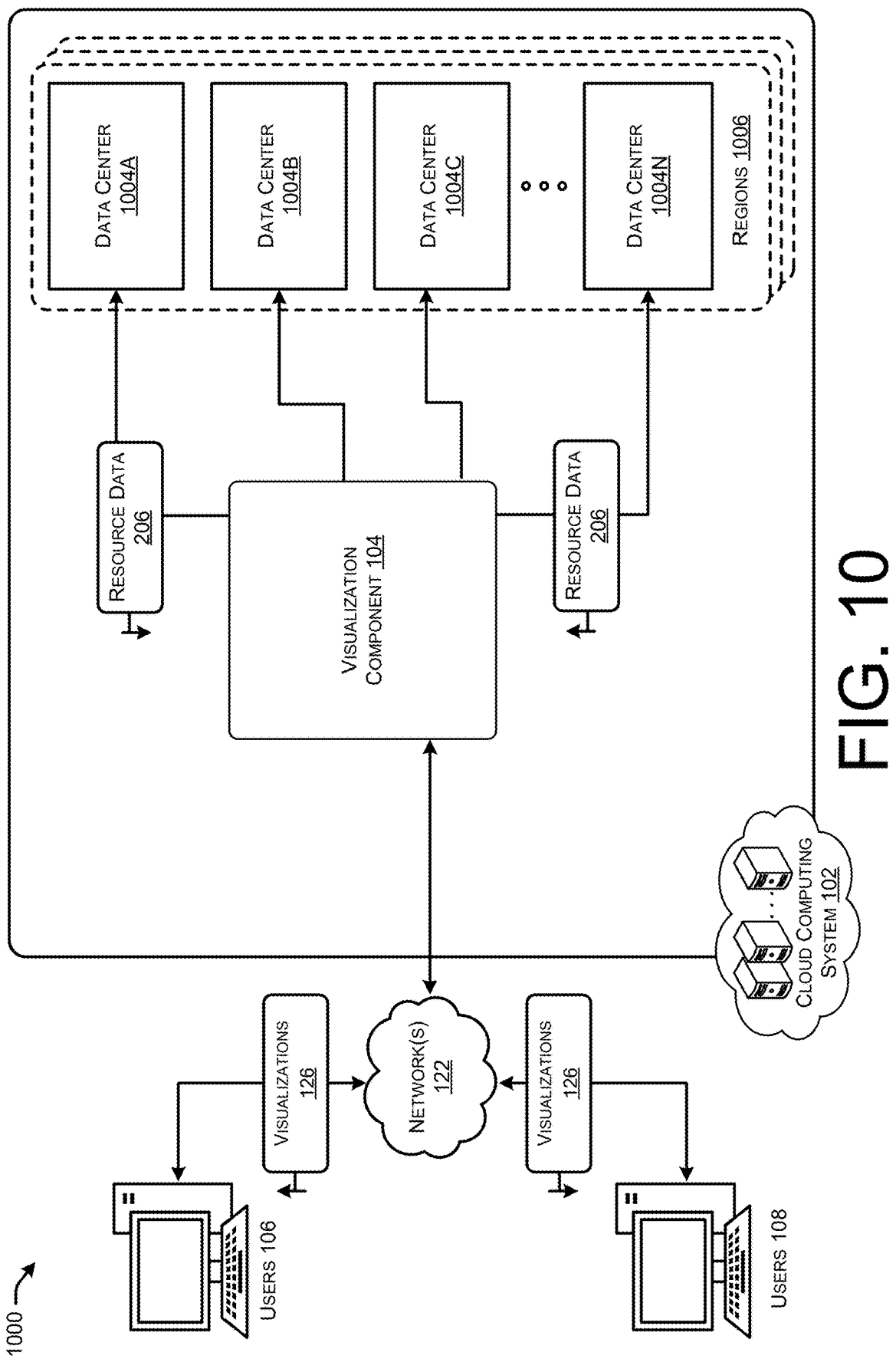
FIG. 10 is a system and network diagram that shows an illustrative operating environment that includes data centers of a cloud provider network that can be configured to implement aspects of the functionality described herein.

FIG. 10 is a system and network diagram 1000 that shows an illustrative operating environment that includes data centers 1004 in one or more regions 1006 of a cloud computing system 102 that can be configured to implement aspects of the functionality described herein. The cloud computing system 102 can provide computing resources, like VM instances and storage, on a permanent or an as-needed basis. Among other types of functionality, the computing resources provided by the cloud computing system 102 may be utilized to implement the various services described above. As also discussed above, the computing resources provided by the cloud computing system 102 can include various types of computing resources, such as data processing resources like VM instances, data storage resources, networking resources, data communication resources, network services, and the like.

Each type of computing resource provided by the cloud computing system 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The cloud computing system 102 can also be configured to provide other types of computing resources not mentioned specifically herein.

The computing resources provided by the cloud computing system 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1008. One illustrative embodiment for a data center 1004 that can be utilized to implement the technologies disclosed herein will be described below with regard to FIG. 11.

The users 108, such as administrators, of the user devices that utilize the cloud computing system 102 may access the computing resources provided by the cloud computing system 102 over any wired and/or wireless network(s) 120, which can be a wide area communication network ("WAN"), such as the Internet, an intranet or an Internet service provider ("ISP") network or a combination of such networks. For example, and without limitation, a user device operated by a user 108 of the cloud computing system 102 may be utilized to access the cloud computing system 102 by way of the network(s) 120. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
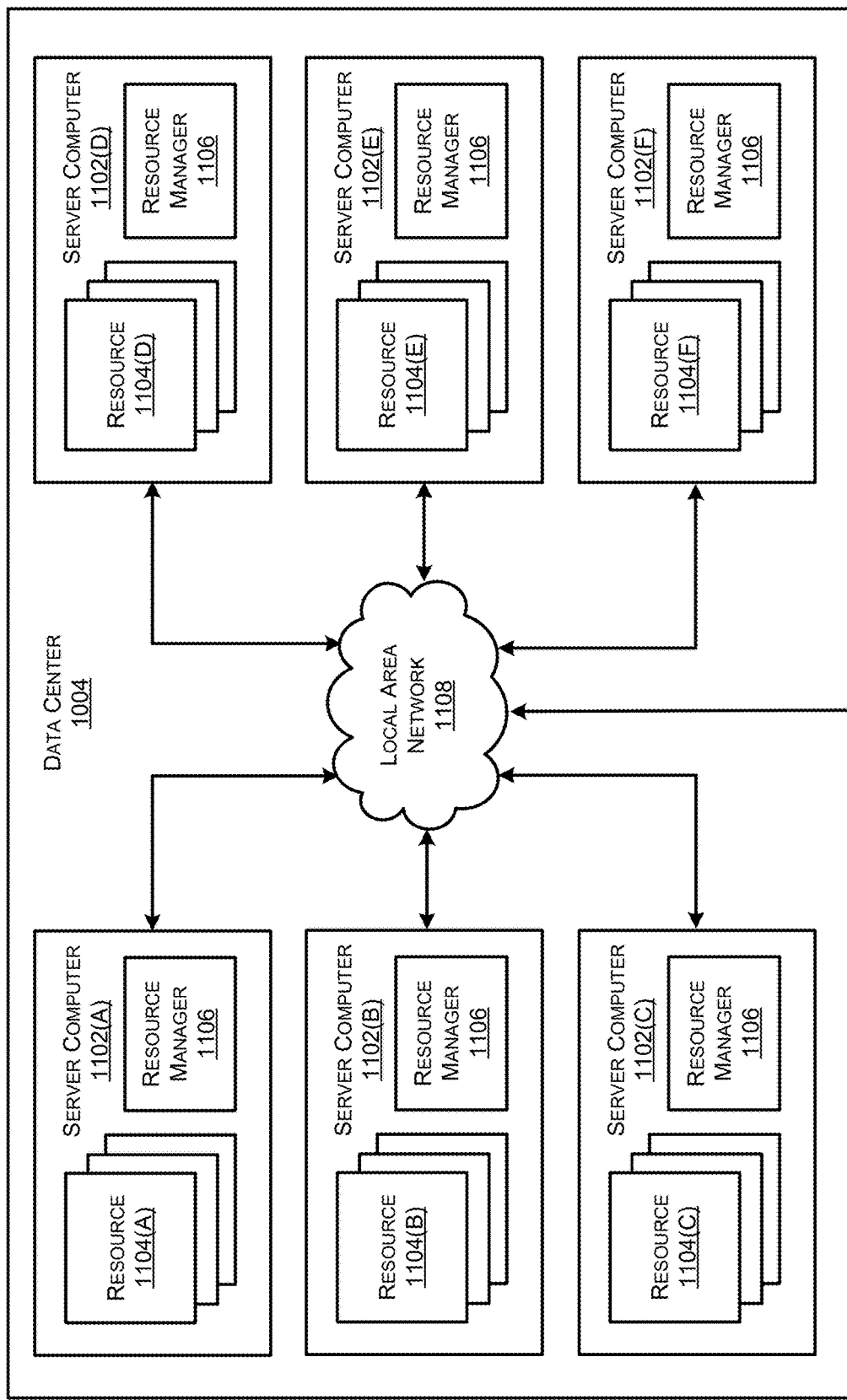
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the cloud computing system 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

Figure 12:
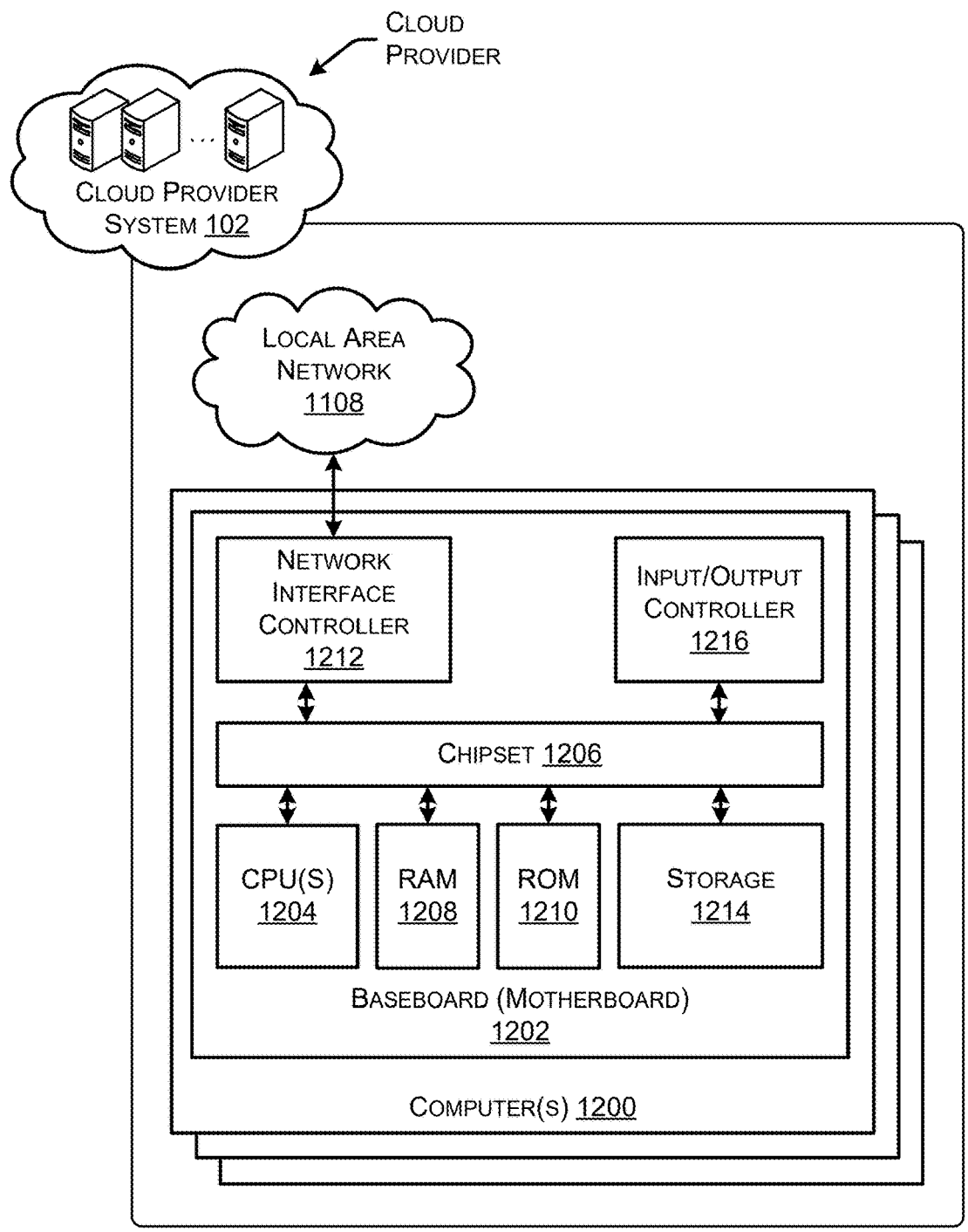
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components or services presented herein. That is, all of the components or services may be supported by or run on one or more computers 1200.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1108. The chipset 1206 can include functionality for providing network connectivity through a network interface controller (NIC) 1212, such as a gigabit Ethernet adapter. The NIC 1212 is capable of connecting the computer 1200 to other computing devices over the network 1108 (or 104). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the cloud computing system 102, and or any components included therein, may be supported by one or more devices similar to computer 1200. Stated otherwise, some or all of the operations performed by the cloud computing system 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A computer-implemented method comprising:
running computing resources in a private network of a cloud system, wherein the private network is usable by a user account registered with the cloud system;
receiving, via an interface that is usable to manage the private network, a request from the user account for a visualization of network relationships between the computing resources in the private network;
obtaining resource data that indicates the computing resources running in the private network, the resource data including attributes for the computing resources that indicate networks relationships between the computing resources;
using the resource data, determining the network relationships between the computing resources in the private network;
generating the visualization that depicts the network relationships between the computing resources in the private network, wherein the visualization of the network relationships between the computing resources includes:
a first visual element that visually displays a subnetwork (subnet) of the private network;
a second visual element that visually displays a route table that is connected to the subnet;
a third visual element that visually displays a gateway usable to communicate with external resources that are external to the private network; and
a fourth visual element that visually displays a network connection over which traffic flows between the route table and the gateway; and
causing presentation of the visualization of the network relationships between the computing resources to the user account via the interface such that the interface visually displays the first visual element that visually displays the subnet, the second visual element that visually displays the route table, the third visual element that visually displays the gateway, and the fourth visual element that visually displays the network connection.

2. The computer-implemented method of claim 1, further comprising:
receiving, via the interface, user input indicating an interaction with a visual element that represents a particular computing resource in the visualization; and
causing presentation, via the interface, of network details associated with the particular computing resource based at least in part on receiving the user input indicating the interaction.

3. The computer-implemented method of claim 1, wherein the subnet comprises a first subnet, and the visualization of the network relationships between the computing resources includes:
a fifth visual element representing the first subnet in a first availability zone of the private network;
a sixth visual element representing a second subnet in a second availability zone of the private network;
a seventh visual element that represents a route table; and
one or more eighth visual elements that represent connections between the route table and the first and second subnets.

4. The computer-implemented method of claim 1, further comprising:
receiving user input indicating a request to visually display network details associated with the subnet, the route table, and the gateway; and
causing presentation in the visualization of:
an Internet Protocol (IP) address associated with the subnet;
a first number of subnets associated with the route table and a second number of routes in the route table; and
a third number of routes to public subnets provided by the gateway.

5. A cloud computing system comprising:
one or more processors; and
one or more computer-readable media storing computer-executable instructions that, when executed by the one or more processors, cause the one or more processors to perform operations comprising:
running computing resources in a private network of the cloud computing system, wherein the private network is associated with a user account registered with the cloud computing system;
collecting resource data associated with the private network that indicates the computing resources running in the private network and attributes associated with the computing resources;
using the resource data, determining relationships between the computing resources in the private network;
generating a visualization that represents the relationships between the computing resources in the private network; and
outputting the visualization to a user device associated with the user account, wherein outputting the visualization includes:
outputting a first visual element that visually displays a subnetwork (subnet) of the private network;
outputting a second visual element that visually displays a route table that is associated with the subnet;
outputting a third visual element that visually displays a gateway usable to communicate with external resources that are external to the private network; and
outputting a fourth visual element that visually displays a network connection over which traffic flows between the route table and the gateway.

6. The cloud computing system of claim 5, the operations further comprising:
providing the user account with access to an interface that is usable to manage the private network; and
receiving, via the interface, a request from the user account for the visualization, wherein the visualization output to the user device via the interface.

7. The cloud computing system of claim 5, the operations further comprising:
receiving user input indicating an interaction with a visual element of the visualization that corresponds a particular computing resource in the private network; and
outputting, to the user device, a visual representation indicating network details associated with the particular computing resource based at least in part on receiving the user input indicating the interaction.

8. The cloud computing system of claim 5, the operations further comprising:
receiving user input indicating an interaction with a visual element of the visualization that corresponds a particular computing resource in the private network; and
outputting, to the user device, a visual representation indicating network connections between the particular computing resource and other computing resources with which the particular computing resource communicates.

9. The cloud computing system of claim 5, wherein outputting the visualization includes:
outputting a fifth visual element representing the first subnet in a first availability zone of the private network;
outputting a sixth visual element representing a second subnet in a second availability zone of the private network;
outputting a seventh visual element that represents a route table; and
outputting one or more eighth visual elements that represent connections between the route table and the first and second subnets.

10. The cloud computing system of claim 5, wherein outputting the visualization to the user device comprises:
outputting a first visual element that represents a first computing resource and a second visual element that represents a second computing resource; and
outputting text that represents names assigned to the computing resources, wherein the visual elements are associated with portions of the text that represent respective names for the visual elements.

11. The cloud computing system of claim 5, wherein the private network is a first private network, the operations further comprising:
receiving, via an interface exposed by the cloud computing system, a selection of a second private network associated with the user account;
in response to receiving the selection of the second private network, generating a second visualization that represents second relationships between second computing resources in the second private network; and
outputting the second visualization to the user account.

12. A method comprising:
generating a visualization that represents relationships between computing resources in a private network, the private network being associated with a user account of a cloud computing system in which the private network is running;
outputting, in the visualization and via a user interface accessible by the user account, a first visual element representing a first computing resource in the private network;
outputting, in the visualization and via the user interface, a second visual element representing a second computing resource in the private network;
outputting, in the visualization and via the user interface, a third visual element representing a relationship between the first computing resource and the second computing resource;
outputting, in the visualization and via the user interface, a fourth visual element that visually displays a subnetwork (subnet) of the private network;
outputting, in the visualization and via the user interface, a fifth visual element that visually displays a route table that is associated with the subnet;
outputting, in the visualization and via the user interface, a sixth visual element that visually displays a gateway usable to communicate with external resources that are external to the private network;
outputting, in the visualization and via the user interface, a seventh visual element that visually displays a network connection over which traffic flows between the route table and the gateway;
receiving first input from the user account indicating an interaction made with the first visual element being output via the user interface;
based at least in part on the interaction, presenting resource data associated with the first computing resource;
receiving second input indicating a re-configuration to a network detail of the resource data associated with the first computing resource; and
re-configuring the network detail of the first computing resource in the private network based at least in part on the second input.

13. The method of claim 12, wherein;
the resource data comprises an indication of Internet Protocol (IP) addresses associated with the subnet.

14. The method of claim 12, wherein:
the resource data comprises an indication of a first number of routes in the route table or a second number of subnetworks with which the route table is associated.

15. The method of claim 12, wherein:
the resource data comprises an indication of a first number of routes through the network connection between internal subnetworks of the private network and one or more external networks that are external to the private network.

16. The method of claim 12, further comprising:
outputting, in the visualization and via the user interface, an eighth visual element representing a third computing resource in the private network;
outputting, in the visualization and via the user interface, a ninth visual element representing a second relationship between the second computing resource and the third computing resource;
modifying:
a first display attribute of the third visual element representing the relationship between the first and second computing resources; and
a second display attribute of the ninth visual element representing the second relationship between the second and third computing resources.

17. The method of claim 12, further comprising:
receiving additional input from the user account indicating an additional interaction with an option to present additional resource data associated with each of the computing resources in the private network; and
based at least in part on the interaction, outputting the additional resource data associated with each of the first and second computing resources in the visualization.

18. The method of claim 12, wherein the relationship indicates network traffic that is communicated between the first computing resource and the second computing resource.

19. The method of claim 12, wherein:
the second computing resource is a route table; and
the relationship indicates that the route table is associated with the first computing resource.

20. The method of claim 12, wherein:
the first computing resource is a route table associated with the private network; and
re-configuring the network detail associated with the route table comprises implementing a modification to a route represented in the route table, further comprising visually displaying the modification to the route in the visualization.

\* \* \* \* \*